(12) United States Patent
Zhang et al.

(10) Patent No.: US 9,019,991 B1
(45) Date of Patent: Apr. 28, 2015

(54) METHOD AND APPARATUS FOR DETECTING A PACKET IN A WLAN SYSTEM

(71) Applicant: Marvell International Ltd., Hamilton (BM)

(72) Inventors: Hongyuan Zhang, Fremont, CA (US); Sudhir Srinivasa, Sunnyvale, CA (US); Sergey Timofeev, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 88 days.

(21) Appl. No.: 13/708,298

(22) Filed: Dec. 7, 2012

Related U.S. Application Data

(60) Provisional application No. 61/568,581, filed on Dec. 8, 2011, provisional application No. 61/615,181, filed on Mar. 23, 2012.

(51) Int. Cl.
| | |
|---|---|
| *H04J 3/24* | (2006.01) |
| *H04W 4/00* | (2009.01) |
| *H04B 7/02* | (2006.01) |
| *H04L 27/00* | (2006.01) |
| *H04L 29/02* | (2006.01) |

(52) U.S. Cl.
CPC ..................................... *H04L 29/02* (2013.01)

(58) Field of Classification Search
USPC ................... 370/474, 330, 334; 375/295, 267
See application file for complete search history.

(56) References Cited

U.S. PATENT DOCUMENTS

| | | | |
|---|---|---|---|
| 7,599,332 B2 | 10/2009 | Zelst et al. | |
| 7,742,390 B2 | 6/2010 | Mujtaba | |
| 8,619,907 B2 | 12/2013 | Mujtaba et al. | |
| 8,826,106 B2 | 9/2014 | Zhang et al. | |
| 2006/0007891 A1* | 1/2006 | Aoki et al. | 370/334 |

(Continued)

FOREIGN PATENT DOCUMENTS

WO   WO-2012/122119 A1   9/2012

OTHER PUBLICATIONS

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

(Continued)

*Primary Examiner* — Kiet Tang

(57) ABSTRACT

A method for transmitting a data packet includes prepending to the digital contents of the data packet a preamble including a first preamble field having a plurality of repetitions of a sequence. The method also includes determining according to a specified communication protocol a first transmission power level for the data packet and determining according to the specified communication protocol and the first preamble field an unadjusted transmission power level for the first preamble field. The method further includes determining the presence of one or more power-boost characteristics of the data packet or of an intended receiving client, transmitting the first preamble field at a first adjusted transmission power level if one or more power-boost characteristics are determined to be present, and transmitting a remainder of the data packet at the first transmission power level for the data packet.

22 Claims, 11 Drawing Sheets

(56) References Cited

U.S. PATENT DOCUMENTS

| | | | |
|---|---|---|---|
| 2006/0034384 | A1* | 2/2006 | Lee ............................... 375/267 |
| 2009/0196163 | A1 | 8/2009 | Du |
| 2009/0225722 | A1* | 9/2009 | Cudak et al. .................. 370/330 |
| 2010/0046358 | A1 | 2/2010 | van Nee |
| 2010/0091675 | A1 | 4/2010 | Sawai |
| 2010/0309834 | A1 | 12/2010 | Fischer et al. |
| 2011/0002219 | A1 | 1/2011 | Kim et al. |
| 2013/0230120 | A1* | 9/2013 | Yang et al. .................... 375/295 |

OTHER PUBLICATIONS

Park, "Proposed Specification Framework for TGah", *The Institute of Electrical and Electronics Engineers*, doc. No. IEEE 802.11-11/1137r6, (Mar. 2012).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, Apr. 2003.

Gunnam, et al., "Multi-Rate Layered Decoder Architecture for Block LDPC Codes of the IEEE 802.11 n Wireless Standard," IEEE International Symposium on Circuits and Systems, 2007 (ISCAS 2007), pp. 1645-1648 (2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11-2007 (revision of IEEE Std. 802.11-1999) "Information Standard for Information technology-Telecommunications and information exchange between systems-Local and metropolitan area networks-Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

IEEE Std 802.11ac/D2.1 "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers*, Inc., pp. 1-363 (Mar. 2012).

IEEE Std 802.11ac/D3.0 "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughout for Operation in Bands below 6 GHz," *The Institute of Electrical and Electronics Engineers, Inc.*, pp. 1-385 (Jun. 2012).

IEEE Std 802.11ac/D4.0 "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11af/D1.05 "Draft Standard for Information Technology—Telecommunications and information exchange between systems—Local and metropolitan area networks—Specificrequirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

IEEE Std 802.11 ™2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std. 802.11n™"IEEE Standard for Information Technology—Telecommuncations and Information exchange between systems—Local and metropolitan area networks—Specific requirements, Part 11: Wireless LAN Medium Access Control (MAC) and Physical Layer (PHY) Specifications Amendment 5: Enhancements for Higher Throughput," *The Institute of Electrical and Electronics Engineers, Inc.*, pp. 1-535 (Oct. 2009).

de Vegt, "Potential Compromise for 802.11ah Use Case Document", Institute of Electrical and Electronics Engineers, doc. No. IEEE 802.11-11/0457r0, pp. 1-27 (Mar. 2011).

Lee et al., "TGaf PHY proposal," *The Institute of Electrical and Electronics Engineers*, doc. No. IEEE 802.11-12/0809r5, pp. 1-43 (Jul. 10, 2012).

Park, "Proposed Specification Framework for TGah D9.x", *The Institute of Electrical and Electronics Engineers*, doc. No. IEEE 802.11-yy/xxxxr0, pp. 1-30 (Jul. 2012).

Park, "Proposed Specification Framework for TGah", *The Institute of Electrical and Electronics Engineers*, doc. No. IEEE 802.11—yy/xxxxr05, (Jan. 2012).

Park, "Proposed Specification Framework for TGah", *The Institute of Electrical and Electronics Engineers*, doc. No. IEEE 802.11-11/1137r11, pp. 1-36 (Sep. 2012).

Park, "Proposed Specification Framework for TGah", *The Institute of Electrical and Electronics Engineers*, doc. No. IEEE 802.11-11/1137r6, pp. 1-13 (Mar. 2012).

Perahia, et al., "Gigabit Wireless LANs: an overview of IEEE 802.11ac and 80211ad," ACM SIGMOBLILE Computing and Communications Review, vol. 15, No. 3, pp. 23-33 (Jul. 2011).

Shao, "Channel Selection for 802.11ah," doc.: IEEE 802.11-12/0816r0, pp. 1-11 (Jul. 2012).

Stacey et al., "IEEE P802.11, Wireless LANs, Proposed TGac Draft Amendment," *The Institute of Electrical and Electronics Engineers*, doc. No. IEEE 802.11-10/1361r3 pp. 1-154 (Jan. 2011).

Stacey et al., "Specification Framework for TGac," document No. IEEE 802.11-09/0992r20, *The Institute of Electrical and Electronics Engineers*, pp. 1-49, (Jan. 18, 2011).

Taghavi et al., "Introductory Submission for TGah", doc. No. IEEE 802.11-11/0062r0, *The Institute of Electrical and Electronics Engineers*, pp. 1-5 (Jan. 14, 2011).

Vermani, et al. "Preamble Format for 1 MHz," *The Institute of Electrical and Electronics Engineers*, doc. No. IEEE 802.11-11/1482r2, pp. 1-30 (Nov. 2011).

Vermani, et al. "Spec Framework Text for PHY Numerology," *The Institute of Electrical and Electronics Engineers*, doc. No. IEEE 802.11-11/13111-0, pp. 1-5 (Sep. 2011).

Yu et al., "Coverage extension for IEEE802.11ah," *The Institute of Electrical and Electronics Engineers*, doc. No. IEEE 802.11-11/0035r1, pp. 1-10 (Jan. 2011).

Zhang et al., "11 ah Data Transmission Flow," *The Institute of Electrical and Electronics Engineers*, doc. No. IEEE 802.11-11/1484r1, pp. 1-15 (Nov. 2011).

Zhang et al., "1 MHz Waveform in Wider BW ", *The Institute of Electrical and Electronics Engineers*, doc. No. IEEE 802.11-12/0309r1, pp. 1-10 (Mar. 2012).

Zhang et al., "Beamforming Feedback for Single Stream," *The Institute of Electrical and Electronics Engineers*, doc. No. IEEE 802.11-12/1312r0, pp. 1-22 (Nov. 12, 2012).

\* cited by examiner

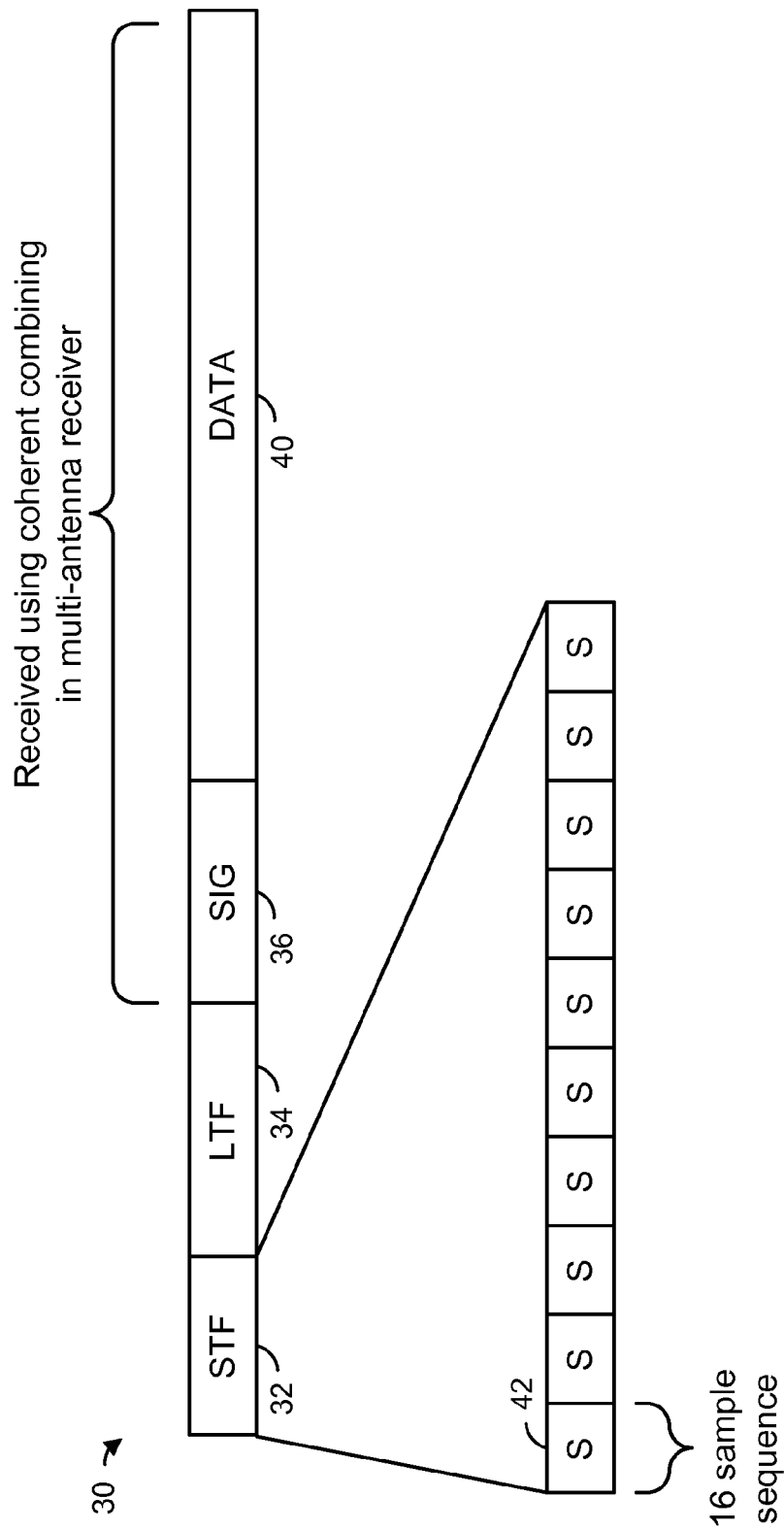

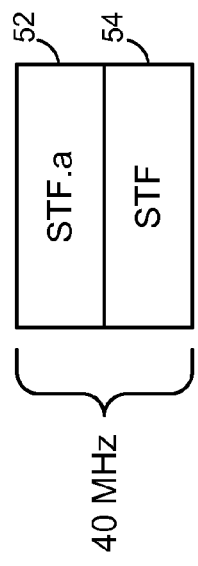
*FIG. 3A*  *PRIOR ART*
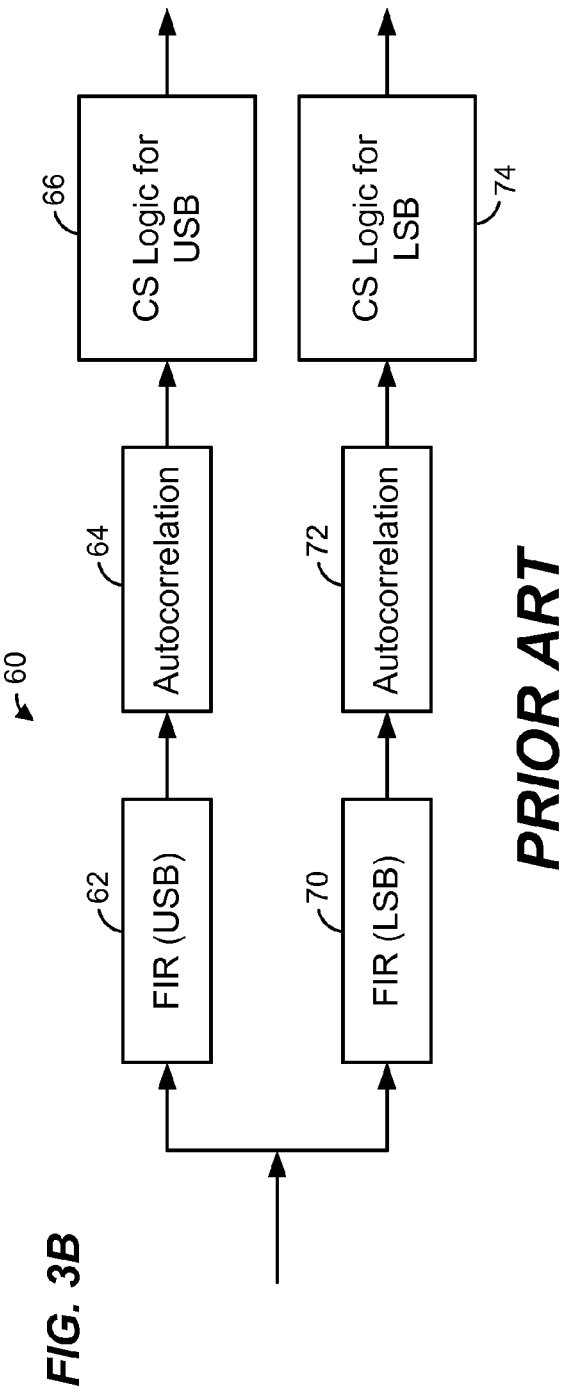
*FIG. 3B*  *PRIOR ART*

METHOD AND APPARATUS FOR DETECTING A PACKET IN A WLAN SYSTEM

CROSS REFERENCE TO RELATED APPLICATIONS

This disclosure claims the benefit of U.S. Provisional Patent Application Nos. 61/568,581, filed Dec. 8, 2011, and 61/615,181, filed Mar. 23, 2012, respectively entitled "Power Boost for STF in 11n/11ac" and "STF/LTF Power Boost," the disclosures of which are hereby expressly incorporated herein by reference.

FIELD OF TECHNOLOGY

The present disclosure relates generally to communication networks and, more particularly, to wireless communication systems that use carrier sensing and/or channel estimation techniques.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Development of wireless local area network (WLAN) standards such as the Institute for Electrical and Electronics Engineers (IEEE) 802.11 standards has improved single-user peak data throughput. For example, the IEEE 802.11a and 802.11g standards specify a single-user peak throughput of 54 megabits per second (Mbps), the IEEE 802.11n standard specifies a single-user peak throughput of 600 Mbps, and the IEEE 802.11ac standard specifies a single-user peak throughput in the Gbps range. Work has also begun on two new standards, IEEE 802.11ah and IEEE 802.11af, each of which will specify wireless network operation in sub-1 GHz frequencies. Receivers of devices in 802.11 WLAN systems such as those mentioned above typically perform carrier sensing and symbol timing operations in order to detect a received packet and determine the timing of orthogonal frequency division multiplexing (OFDM) symbols within the packet.

SUMMARY

In one embodiment, a method for transmitting a data packet includes prepending to the digital contents of the data packet a preamble including a first preamble field having a plurality of repetitions of a sequence, determining according to a specified communication protocol a first transmission power level for the data packet, determining according to the specified communication protocol and the first preamble field an unadjusted transmission power level for the first preamble field, determining the presence of one or more power-boost characteristics of the data packet or of an intended receiving client, transmitting the first preamble field at a first adjusted transmission power level if one or more power-boost characteristics are determined to be present, and transmitting a remainder of the data packet at the first transmission power level for the data packet.

In another embodiment, a communication device includes a digital communication block for receiving the digital payload of a data packet and composing the data packet, wherein the digital communication block is configured to prepend a preamble including a first preamble field having a plurality of repetitions of a sequence. The communication device also includes a digital-to-analog converter and an analysis module configured to analyze the data packet and determine: a first transmission power level for the data packet according to a specified communication protocol, a first unadjusted transmission power for the first preamble field according to the specified communication protocol and the first preamble field, and the presence of one or more power-boost characteristics of the data packet or an intended receiving client. Further, the communication device includes a digital variable gain amplifier configured to transmit the first preamble field at a first adjusted transmission power level if one or more power boost characteristics are determined to be present and to transmit a remainder of the data packet at the first transmission power level for the data packet.

BRIEF DESCRIPTION OF THE DRAWINGS

FIG. 2 is a diagram of a preamble of a prior art IEEE 802.11a data unit.

FIG. 3A is a diagram of a portion of a prior art preamble.

FIG. 3B is a block diagram of a prior art carrier sense architecture.

DETAILED DESCRIPTION

In embodiments described below, a wireless network device such as an access point (AP) of a wireless local area network (WLAN) transmits data streams to, and/or receives data streams from, one or more client stations. The AP is configured to communicate with client stations according to a communication protocol that utilizes physical layer (PHY) data units with preambles designed to support carrier sensing (packet detection) and/or symbol timing and/or channel estimation at the receiving device. For example, in WLAN systems that utilize orthogonal frequency division multiplexing (OFDM) modulation and operate according to the IEEE 802.11a, 802.11n, or 802.11 ac standards, the first part of the preamble of each PHY data unit includes a short training field (STF) with a periodically repeating sequence. Carrier sensing and symbol timing are typically conducted based on the STF of the received packet, before data is demodulated or decoded. In conventional systems, packet detection and symbol timing are both determined based on an autocorrelation performed on the received signal. The autocorrelation operation takes advantage of the periodic time domain structure of the STF, which has a known periodicity, to detect the STF and therefore detect the packet. The autocorrelation also provides an indication of the end of the STF, which coincides with the start of an OFDM symbol in a long training field (LTF) that follows the STF, to determine symbol timing. By contrast, the receiver uses the LTF to perform channel estimation, carrier frequency offset synchronization, and time synchronization. In particular, channel estimation characterizes the signal propagation path from the transmitter to the receiver to represent the combined effects of channel conditions such as scattering, fading, multipath effects, and path distance.

At low signal-to-noise ratios (SNRs), these conventional systems improve the reliability of data communications by using error control coding, and/or using coherent combining with multiple receive antennas. Coherent combining generally requires the channel estimation information described above, typically based on the LTF of received packets. As described above, however, carrier sensing and symbol timing are typically conducted based on time domain autocorrelations, without the benefit of error control coding or coherent combining. Thus, carrier sensing and symbol timing can act as a bottleneck for the sensitivity of the receiver as a whole. The conventional approach is described in further detail below with reference to FIGS. 1-4, and systems and techniques for improving carrier sensing and/or symbol timing and/or channel estimation are described below with reference to FIGS. 5-10.

Figure 1:
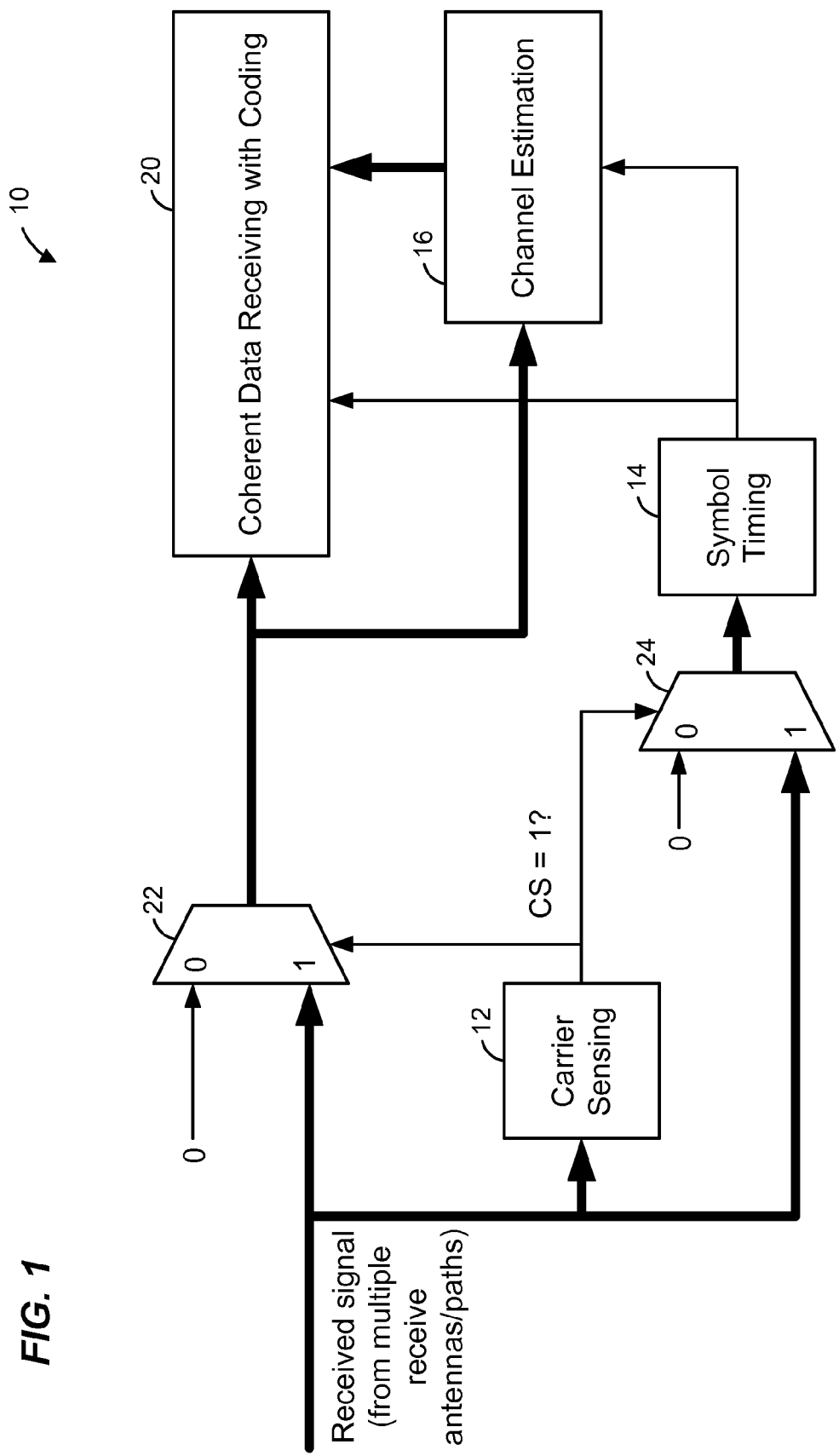
FIG. 1 is a block diagram of a prior art receiver architecture.

FIG. 1 is a block diagram of a prior art receiver architecture 10 for performing various receiver functions in OFDM-based WLAN systems such as IEEE 802.11a, 802.11g, 802.11 ac, and 802.11n systems. Specifically, the architecture 10 is used to detect packets, determine symbol timing of received packets, perform channel estimation, and coherently receive coded data and signal (SIG) field information within the packets. To this end, the architecture 10 includes a carrier sensing unit 12, a symbol timing unit 14, a channel estimation unit 16, and a coherent data reception unit 20. The carrier sensing unit 12 of the architecture 10 attempts to detect a packet before the data portion of the packet is received, based on an STF in the preamble of the packet. The carrier sensing unit 12 may output a signal (shown as "CS" in FIG. 1) that indicates whether a packet has been detected. The symbol timing unit 14 attempts to determine the timing of OFDM symbols within a received packet by detecting the end of the STF and the beginning of the subsequent LTF. The channel estimation unit 16 attempts to estimate the channel via which packets are received, based on one or more LTFs in the preamble of each received packet. The coherent data reception unit 20 coherently combines signals (from multiple receive antennas) based on the symbol timing determined by the symbol timing unit 14 and the channel information estimated by the channel estimation unit 16. In particular, the coherent data reception unit 20 coherently combines signals corresponding to the SIG field and data field of received packets. The coherent data reception unit 20 also decodes the SIG field and data field according to an error control coding scheme. Both coherent combining and error control coding generally improve the reliability of data reception, particularly at low SNRs.

As seen in FIG. 1, a first multiplexor 22 accepts as an input the received signal, and passes the received signal to the channel estimation unit 16 and the coherent data reception unit 20 only if the output of carrier sensing unit 12 indicates that a packet has been detected. Similarly, a second multiplexor 24 accepts as an input the received signal, and passes the received signal to the symbol timing unit 14 only if the output of carrier sensing unit 12 indicates that a packet has been detected. Thus, the coherent data reception unit 20 and symbol timing unit 14 are only utilized if a packet has been detected by carrier sensing unit 12. The symbol timing unit 14 outputs a signal indicating symbol timing to both the channel estimation unit 16 and the coherent data reception unit 20.

While the architecture 10 coherently combines and decodes the SIG field and data field of received packets, conventional carrier sensing and symbol timing based on the STF do not make use of either error control coding or coherent combining. Instead, carrier sensing and the determination of symbol timing utilize time domain autocorrelations, as described in further detail below with reference to the prior art systems shown in FIGS. 3A and 3B.

FIG. 2 is a diagram of a prior art IEEE 802.11a data unit 30. The data unit 30 includes an STF 32, an LTF 34, a SIG field 36, and a data field 40. As seen in the expanded view of FIG. 2, the STF 32 includes 10 periodically repeating sequences 42 ("S"), with each sequence 42 being 16 samples in length (for a total STF length of two OFDM symbols). The time domain periodic structure of the STF is derived by including non-zero tones at every fourth tone in the frequency domain, and then performing an inverse fast Fourier transform (IFFT) with a cyclic prefix. Although an IEEE 802.11a data unit 30 is shown in FIG. 2 for illustrative purposes, IEEE 802.11n and 802.11 ac data units similarly include a preamble that begins with an STF containing a periodically repeating sequence.

Because the STF 32 exhibits 16-sample periodicity, a receiver conducts an autocorrelation by correlating each 16 samples of a received signal with the next 16 samples of the received signal. If the autocorrelation output rises (i.e., rising edge detection), a packet is detected. When the autocorrelation subsequently falls at the end of the STF 32 and beginning of the LTF 34 (i.e., falling edge detection), symbol timing is determined.

Some WLAN systems utilize communication channels having different bandwidths. For example, systems that operate according to the IEEE 802.11n standard may include APs and client stations configured to transmit OFDM data units in 20 MHz or 40 MHz channels, and systems that operate according to the IEEE 802.11 ac standard may include APs and client stations configured to transmit OFDM data units in 20 MHz, 40 MHz, 80 MHz, or 160 MHz channels. In these systems, the STF of the preamble is duplicated in each 20 MHz subband, but with a different predetermined phase shift applied to the STF in each subband. FIG. 3A is a diagram of a portion 50 of a prior art preamble that includes a first repetition 52 and a second repetition 54 of an STF, with a phase shift a being applied to the first repetition 52. Although multiple STFs within a preamble of a composite channel data unit are referred to throughout this disclosure as "repetitions" or "duplicates" of an STF, or as a "replicated" or "duplicated" STF, it is understood that the time domain signals of the multiple STFs may differ from each other depending on which subband a particular STF occupies, and that the multiple STFs may have different phase shifts applied. For example, STFs 52 and 54 are identical in the frequency domain within each 20 MHz subband, but differ in the time domain due to their frequency offset, and have different phasing.

FIG. 3B is a block diagram of a prior art carrier sense architecture 60 configured to receive data units that include the preamble portion 50 of FIG. 3A (i.e., an STF replicated in each of two 20 MHz subbands). The architecture 60 includes one path for each of the two 20 MHz subbands. The first path includes a finite impulse response (FIR) filter 62 designed to pass the upper sideband (USB) of the received signal (i.e., the signal corresponding to STF repetition 52 in FIG. 3A), an autocorrelation unit 64, and carrier sense logic 66 for detecting a signal in the upper sideband. Similarly, the second path includes a FIR filter 70 designed to pass the lower sideband (LSB) of the received signal (i.e., the signal corresponding to STF repetition 54 in FIG. 3A), an autocorrelation unit 72, and carrier sense logic 74 for detecting a signal in the lower sideband. In IEEE 802.11n and 802.11 ac systems, composite channels formed from multiple 20 MHz channels include one "primary" channel and one or more "secondary" channels. Typically, the output of the carrier sense logic that corresponds to the primary 20 MHz channel is given more weight, and symbol timing is determined based on the autocorrelation for the primary 20 MHz channel. For example, in a scenario where the lower sideband of a 40 MHz signal corresponds to the primary channel and the upper sideband of the 40 MHz signal corresponds to the secondary channel, the output of the carrier sense logic 74 is given more weight than the output of the carrier sense logic 66, and symbol timing is determined based on the output of the autocorrelation unit 72 rather than the output of autocorrelation unit 64.

As noted above, the conventional architectures described above with reference to FIGS. 1-3B do not utilize coherent combining or error control coding for carrier sense and symbol timing, and therefore lack coding gain and coherent combining gain. In a conventional device with multiple receive antennas, for example, the composite autocorrelation output used for carrier sense and symbol timing is:

$$AC(n) = \sum_{i=0}^{N_R-1} AC_i(n) \quad \text{(Equ. 1)}$$

where n is the sample number of the autocorrelation outputs, $AC(n)$ is the composite autocorrelation output, $N_R$ is the total number of samples in each autocorrelation output, and $AC_i(n)$ is the autocorrelation output corresponding to the $i^{th}$ receive antenna. While summing the individual autocorrelation outputs according to Equation 1 provides a small amount of noise reduction, the sensitivity gain is less than that achievable with coherent combining. Conversely, and as also noted above, multi-antenna coherent combining and error control coding are typically used for SIG and data fields, which improves SIG field and data decoding reliability, and allows successful SIG field and data decoding at lower SNRs. Consequently, carrier sense and symbol timing achieve less sensitivity/reliability than SIG field and data decoding, and can become the bottleneck of the overall receiver sensitivity. The problem is exacerbated when transmitting beamformed packets under IEEE 802.11n, and/or when using advanced data receiving technologies (e.g., for better channel estimation) to further improve SIG/data (but not STF) receiving sensitivity. In the case of beamformed packets, for example, the IEEE 802.11n standard specifies that the first, legacy preamble portion (including both STF and LTF legacy portions) of a mixed-mode packet is not to be beamformed for omni transmission, which gives rise to an even larger reliability gap between carrier sense/symbol timing and SIG/data field demodulation and decoding.

Figure 4:
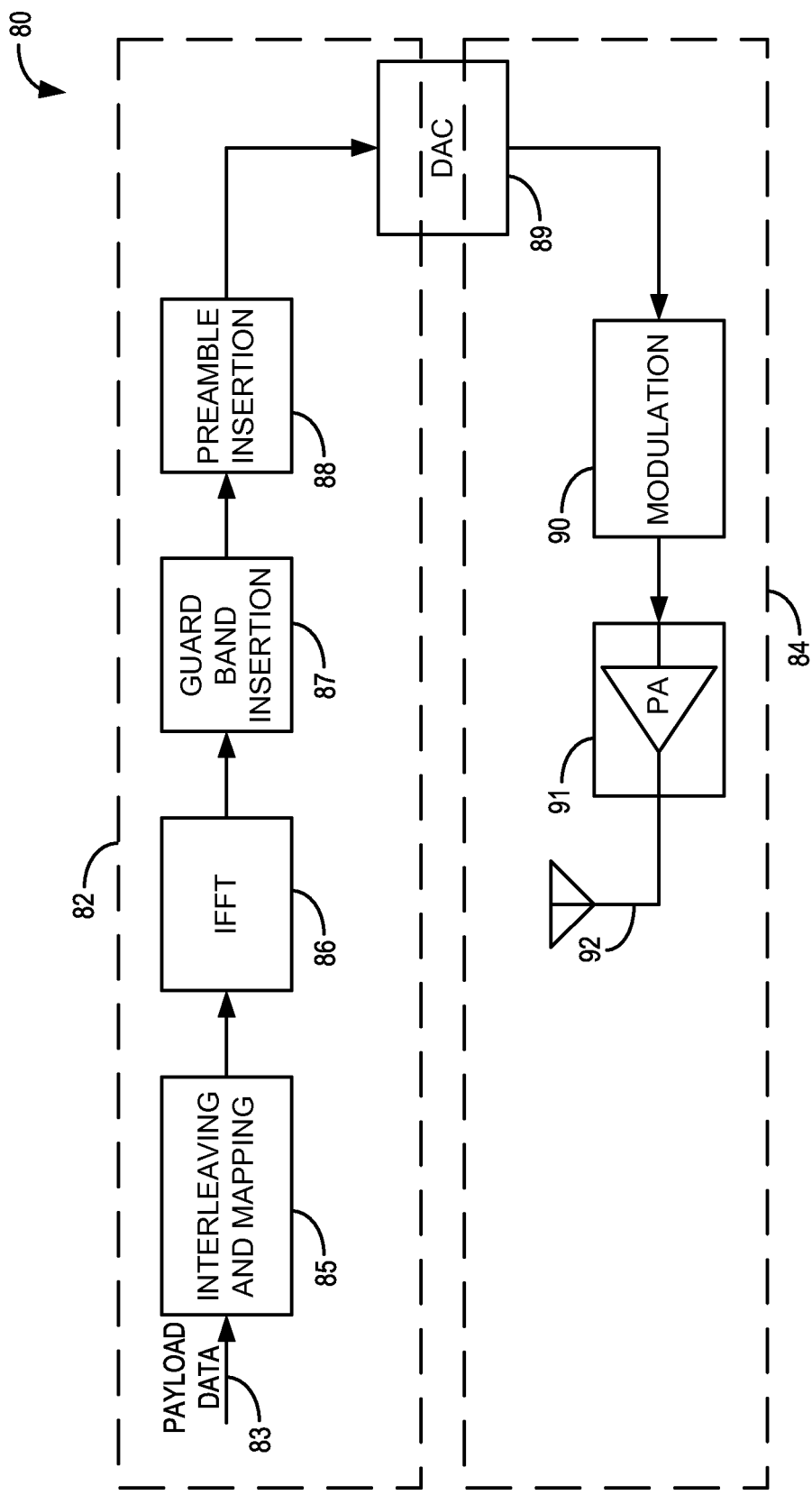
FIG. 4 is a block diagram of a prior art transmitter architecture.

FIG. 4 depicts a block diagram of a simplified prior art transmitter architecture 80. Each block depicted in FIG. 4 may comprise one or more components cooperating to perform one function or multiple functions. Additionally, for the purposes of simplification, various functions implemented separately may be combined into a single block, while other functions, inherent or optional in a WLAN transmitter, may be omitted from the figure entirely. In any event, the transmitter architecture 80 may be divided into two subsystems; a baseband, or digital, subsystem 82, and a radio frequency (RF), or analog subsystem 84. As generally understood, the baseband subsystem 82 receives payload data 83. A module 85 performs interleaving and mapping functions. The data output by the module 85 is converted from the frequency domain to the time domain by implementation of an inverse FFT function 86, and a module 87 adds a guard band to the digital stream. A module 88 inserts a preamble, which may include one or more preamble fields, such as the STF and LTF. A digital-to-analog converter (DAC) 89 converts the signal from a digital signal to an analog signal, and serves generally as an interface between the baseband subsystem 82 and the RF subsystem 84. In the RF subsystem 84, the analog signal is modulated and amplified by a modulator 90 and a power amplifier 91, respectively, and transmitted via an antenna 92.

The techniques and architectures described below with reference to FIGS. 5-10 improve SNR sensitivity during reception of an STF or LTF (or, more generally, during reception of any preamble field that includes a periodically repeating sequence). As a result, sensitivity bottlenecks caused by carrier sensing, symbol timing, and/or channel estimation may be ameliorated, or even removed entirely.

Figure 5:
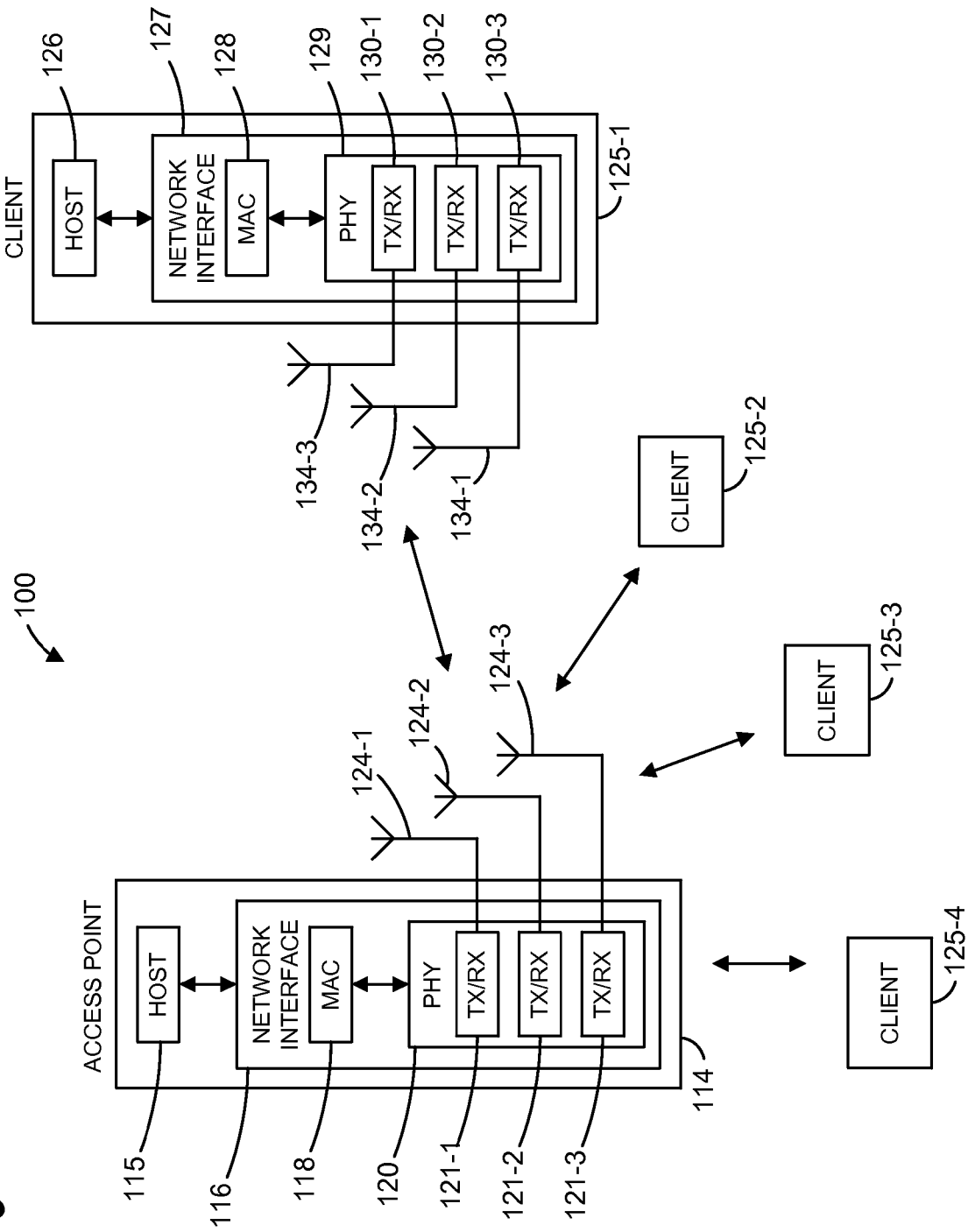
FIG. 5 is a block diagram of an example wireless local area network (WLAN) that implements improved carrier sense and/or symbol timing techniques, according to an embodiment.

FIG. 5 is a block diagram of an example WLAN 100 that implements improved carrier sense and/or symbol timing techniques of the present disclosure, according to an embodiment. An AP 114 includes a host processor 115 coupled to a network interface 116. The network interface 116 includes a media access control (MAC) unit 118 and a PHY unit 120. The PHY unit 120 includes a plurality of transceivers 121, and the transceivers are coupled to a plurality of antennas 124. Although three transceivers 121 and three antennas 124 are illustrated in FIG. 5, the AP 114 can include different numbers (e.g., one, two, four, five, etc.) of transceivers 121 and antennas 124 in other embodiments.

The WLAN 100 also includes a plurality of client stations 125. Although four client stations 125 are illustrated in FIG. 5, the WLAN 100 can include different numbers (e.g., one, two, three, five, six, etc.) of client stations 125 in various scenarios and embodiments. The client station 125-1 includes a host processor 126 coupled to a network interface 127. The network interface 127 includes a MAC unit 128 and a PHY unit 129. The PHY unit 129 includes a plurality of transceivers 130, and the transceivers 130 are coupled to a plurality of antennas 134. Although three transceivers 130 and three antennas 134 are illustrated in FIG. 5, the client station 125-1 can include different numbers (e.g., one, two, four, five, etc.) of transceivers 130 and antennas 134 in other embodiments. In an embodiment, one, two, or three of the client stations 125-2, 125-3, and 125-4 have a structure the same as or similar to the client station 125-1. In these embodiments, the client stations 125 are structured the same as or similar to the client station 125-1 and have the same or a different number of transceivers and antennas. For example, the client station 125-2 has only two transceivers and two antennas, in an embodiment.

The PHY unit 120 of the AP 114 is configured to operate according to one or more communication protocols. At least one of the communication protocols specifies a data unit (also referred to herein as a "data packet") that includes a preamble containing a periodically repeating sequence. In some embodiments, the field with the periodically repeating sequence is the first field of the data unit preamble. For example, in some embodiments (e.g., where the communication protocol is an IEEE 802.11a, 802.11n, 802.11ac, 802.11af, or 802.11ah protocol), the field is an STF with a periodically repeating sequence.

The transceiver(s) 121 of the AP 114 is/are configured to transmit the generated data units via the antenna(s) 124. Similarly, the transceiver(s) 121 is/are configured to receive similar data units via the antenna(s) 124. In various embodiments, the PHY unit 120 of the AP 114 is further configured to process received data units (e.g., data units that conform to any of the one or more communication protocols that the PHY unit 120 supports for transmission).

Similarly, the PHY unit 129 of the client station 125-1 is configured to operate according to one or more communication protocols, including at least the communication protocol of AP 114 that specifies a data unit with a preamble containing a periodically repeating sequence. The transceiver(s) 130 is/are configured to transmit generated data units via the antenna(s) 134. Similarly, the transceiver(s) 130 is/are configured to receive data units via the antenna(s) 234. The PHY unit 129 of the client station 125-1 is further configured to process received data units (e.g., data units that conform to any of the one or more communication protocols that the PHY unit 129 supports for transmission).

Similar to client station 125-1, each of client stations 125-2, 125-3, and 125-4 is configured to operate according to one or more communication protocols, at least one of which is used by AP 114. In some scenarios, some or all of client stations 125-2, 125-3, and 125-4 are configured to operate according to the same communication protocol(s) as client station 125-1.

Figure 6A:
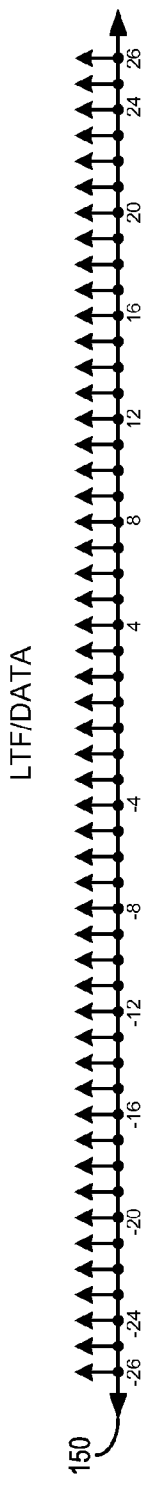
FIG. 6A is a diagram of subcarriers active during transmission of a long training field or a data field in accordance with a WLAN standard.
Figure 6B:
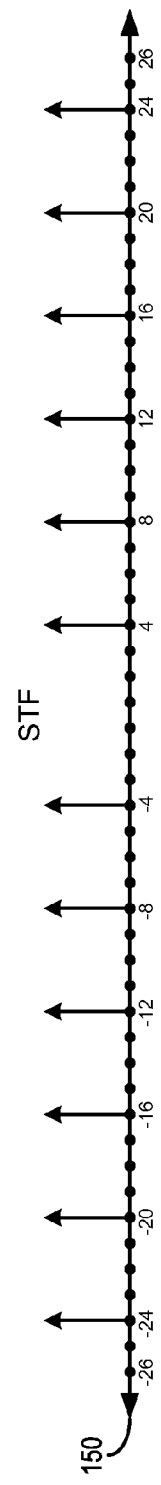
FIG. 6B is a diagram of subcarriers active during transmission of a short training field in accordance with a WLAN standard.

WLAN standards (e.g., IEEE 802.11a, 802.11ac, 802.11n, etc.) generally require that the average transmit power for different OFDM symbols in a data packet is the same, i.e., that transmit power is constant for the data packet. WLAN systems accomplish this by scaling the frequency domain constellation points in different ODFM frame fields (e.g., the STF and data fields) so that each field is normalized to the same power. FIGS. 6A and 6B illustrate the principle. The 802.11 standard specifies 52 OFDM subcarriers −26 to 26, illustrated in FIGS. 6A and 6B along a line 150. Each subcarrier is illustrated in FIGS. 6A and 6B as either a non-zero tone (i.e., a tone having a non-zero output power) or a zero tone (i.e., a tone with no output power). FIG. 6A represents the 52 subcarriers of an exemplary WLAN signal during the transmission of the LTF or data. However, while the LTF and data portions of each data packet are transmitted on all 52 subcarriers, the standard specifies that the STF is transmitted on only a subset of 12 of the subcarriers. FIG. 6B represents the 52 subcarriers of the exemplary WLAN signal during the transmission of the STF. Only 12 of the subcarriers are non zero tones. Accordingly, because approximately one of every four subcarriers is a zero tone during transmission of the STF, each of the non-zero tones during the STF must be transmitted with approximately four times the power.

Figure 6C:
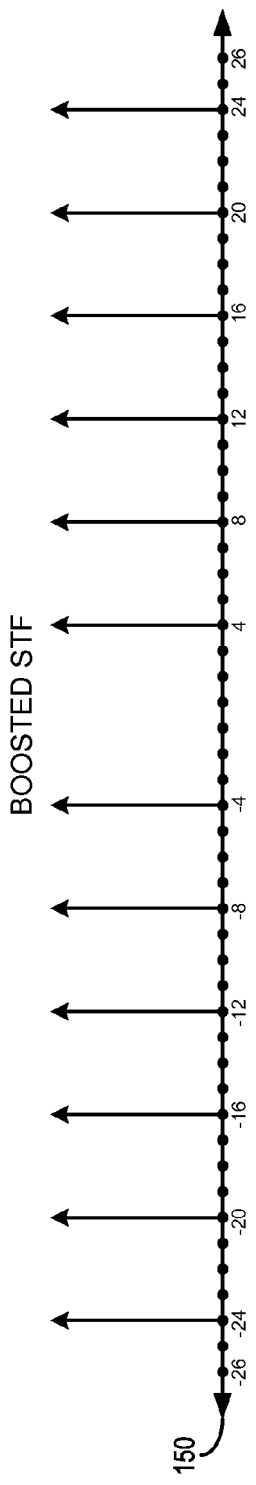
FIG. 6C is a diagram of subcarriers active and having increased power during transmission of a short training field in accordance with the presently described embodiments.
Figure 6D:
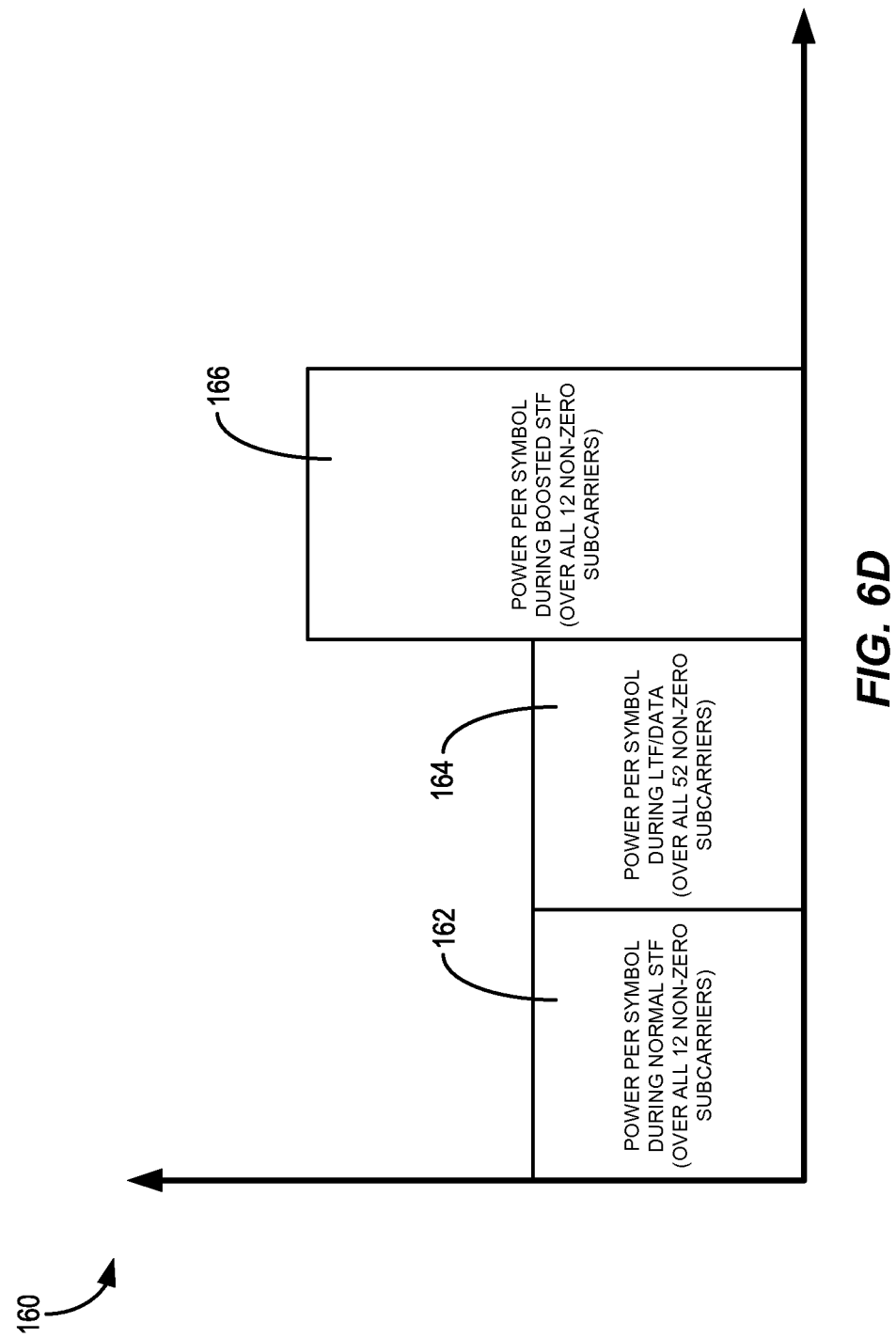
FIG. 6D is a graph comparing power levels across all non-zero subcarriers.

In an embodiment, a WLAN transmitter increases the power of OFDM symbols in the STF relative to the average power of the remaining symbols. As a result, there is more power per symbol transmitted in the STF field than in the remainder of the data packet. FIG. 6C illustrates the principle: the power in each of the 12 subcarriers used for transmission of the adjusted STF is increased relative to each of the 12 subcarriers used for transmission of the unadjusted STF (FIG. 6B). FIG. 6D is a graph 160 illustrating the power per symbol across all active subcarriers. The power per symbol across the subcarriers of the STF during normal operation (e.g., according to various WLAN standards) is depicted as an area 162. For the same data packet, an area 164 depicts the power per symbol across the subcarriers of the LTF or data portions of the data packet. The areas 162 and 164 are approximately the same, as described above with respect to FIGS. 6A and 6B. The power per symbol across the subcarriers of the STF during enhanced operation (i.e., according to the embodiments described herein), is depicted in an area 166. As can be seen in FIG. 6D, the power per symbol in the area 166 is higher than the areas 162 and 164. The graph 160 is not intended to be to scale, however.

Figure 7A:
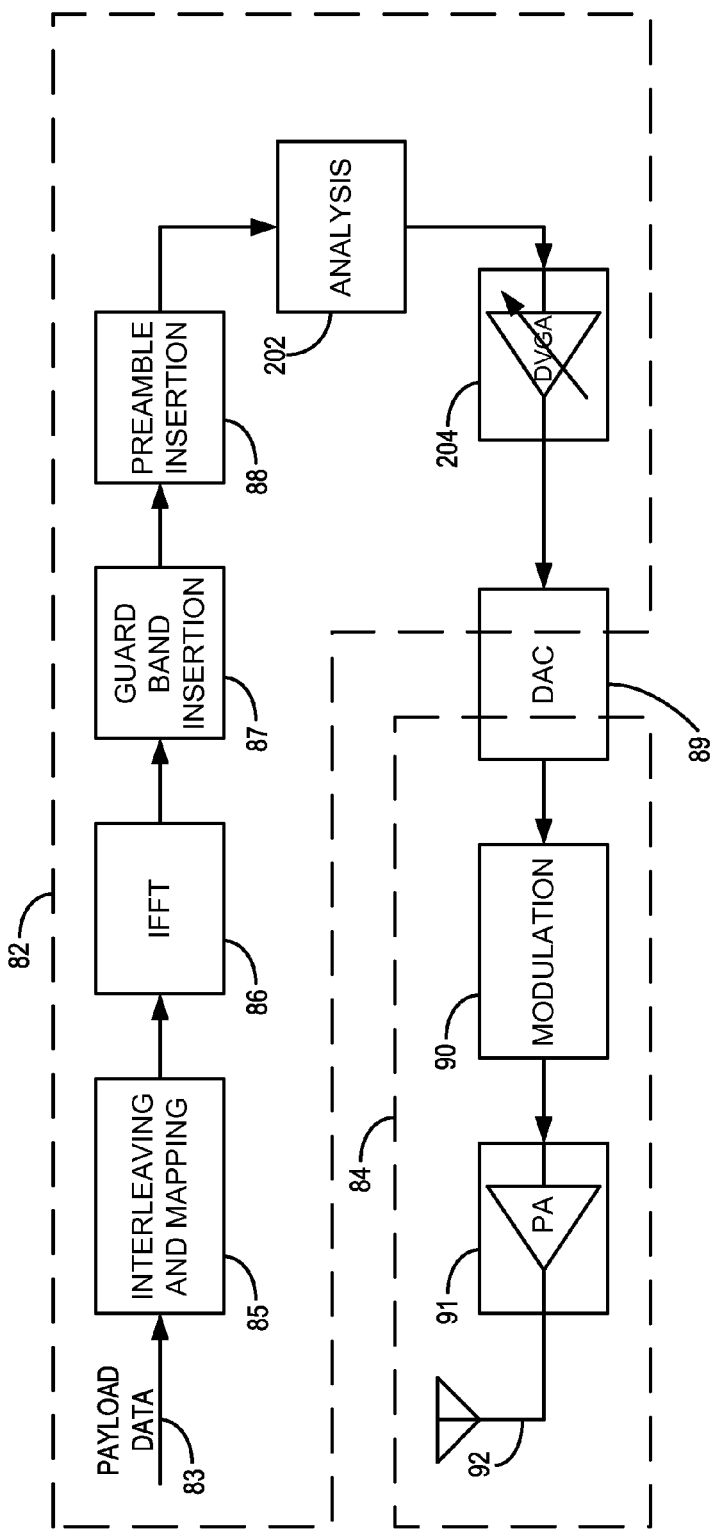
FIG. 7A is a block diagram of a transmitter architecture in accordance with a presently described embodiment.
Figure 7C:
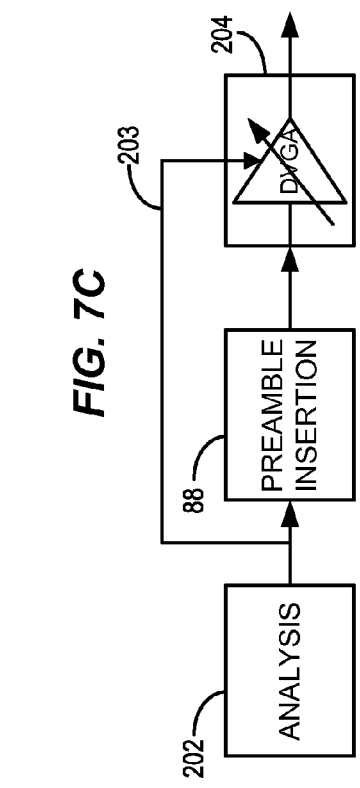
FIG. 7C is a block diagram of another alternate embodiment of a portion of the transmitter architecture of FIG. 7A.

The STF symbol power can be boosted in either the digital or analog domains. FIG. 7A depicts a block diagram of an embodiment of a transmitter architecture 200. The architecture 200 is generally the same as the architecture 80 depicted in FIG. 4, and includes the baseband subsystem 82 and the RF subsystem 84. However, in the embodiment depicted in FIG. 7A, the baseband subsystem 82 includes an analysis module 202. The analysis module 202 operates, at least in part, to calculate or otherwise determine an average transmit power for each data packet, and to calculate or otherwise determine an unadjusted STF transmit power level for the symbols in the STF. The analysis module 202 also operates, in an embodiment, to determine one or more characteristics of or associated with the data packet, which characteristics inform a decision to transmit the symbols of the STF for the data packet at the unadjusted STF transmit power level or at an adjusted STF power level for the data packet. Further, if the analysis module 202 identifies the data packet as one for which the transmit power for the STF symbols should be boosted, the analysis module 202 calculates or otherwise determines the adjusted STF transmit power level for the STF symbols for the data packet.

Various characteristics may inform the decision as to whether to increase the transmit power for the symbols of the STF for a given data packet. In an embodiment, the analysis module 202 detects the modulation and coding scheme (MCS) for the data packet. The analysis module 202 compares the MCS for the data packet to a predetermined set point or a predetermined cutoff, and identifies the data packet as one for which the transmit power for the STF symbols should be increased when the MCS value is below a certain level (e.g., <2). In an embodiment, the analysis module 202 detects the modulation scheme for the data packet and identifies the data packet as one for which the transmit power for the STF symbols should be increased when certain transmission constellations (e.g., BPSK, QPSK, etc.) are implemented. In an embodiment, STF transmit power is boosted only for BPSK data packets.

In still another embodiment, the analysis module 202 analyzes the bandwidth of the data packet to determine whether to increase the transmit power for the STF symbols. For example, in an embodiment the analysis module 202 causes the transmit power for STF symbols to be boosted in data packets having a bandwidth of 20 MHz. In still other embodiments, the analysis module 202 decides for which data packets STF transmit power should be increased according to the receiving client (e.g., for some clients and not others), according to the type of data packet (e.g., for broadcast packets), according to whether the data packet is beamformed, and/or according to the data packet length, etc.

Figure 7B:
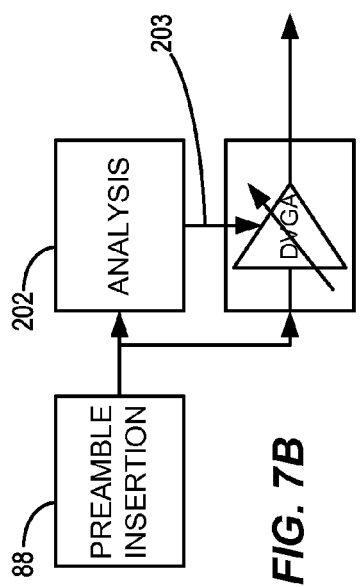
FIG. 7B is a block diagram of an alternate embodiment of a portion of the transmitter architecture of FIG. 7A.

In some embodiments, the analysis module 202 is coupled to a digital variable gain amplifier (DVGA) 204, placed in the transmit path before the DAC 89 (i.e., in the baseband subsystem 82), which operates to digitally scale the STF samples (in either the time or frequency domains) when the analysis module indicates that STF transmit power should be boosted for a particular data packet. In an embodiment, the analysis module 202 is in series with the transmit path (i.e., data packets pass through the analysis module 202 prior to passing, with data about whether to boost the transmit power of the STF symbols, to the DVGA 204). In another embodiment, the analysis module 202 is in parallel with the transmit path (as depicted in FIG. 7B), receiving a copy of each data packet, analyzing the data packet, and sending a signal 203 to the DVGA 204 indicating whether the transmit power of the STF symbols should be boosted, while the DVGA 204 independently receives the data packet directly from the block 88 after preamble insertion. In still another embodiment, depicted in FIG. 7C, the analysis module 202 is in series with the transmit path, but analysis of the data packet occurs prior to insertion of the preamble by the module 88. The analysis module 202 passes the data packet to the preamble insertion module 88, and passes the signal 203 to the DVGA 204, which receives the data packet (with the prepended preamble) from the module 88 and increases the STF TX power level according to the signal 203.

Figure 8:
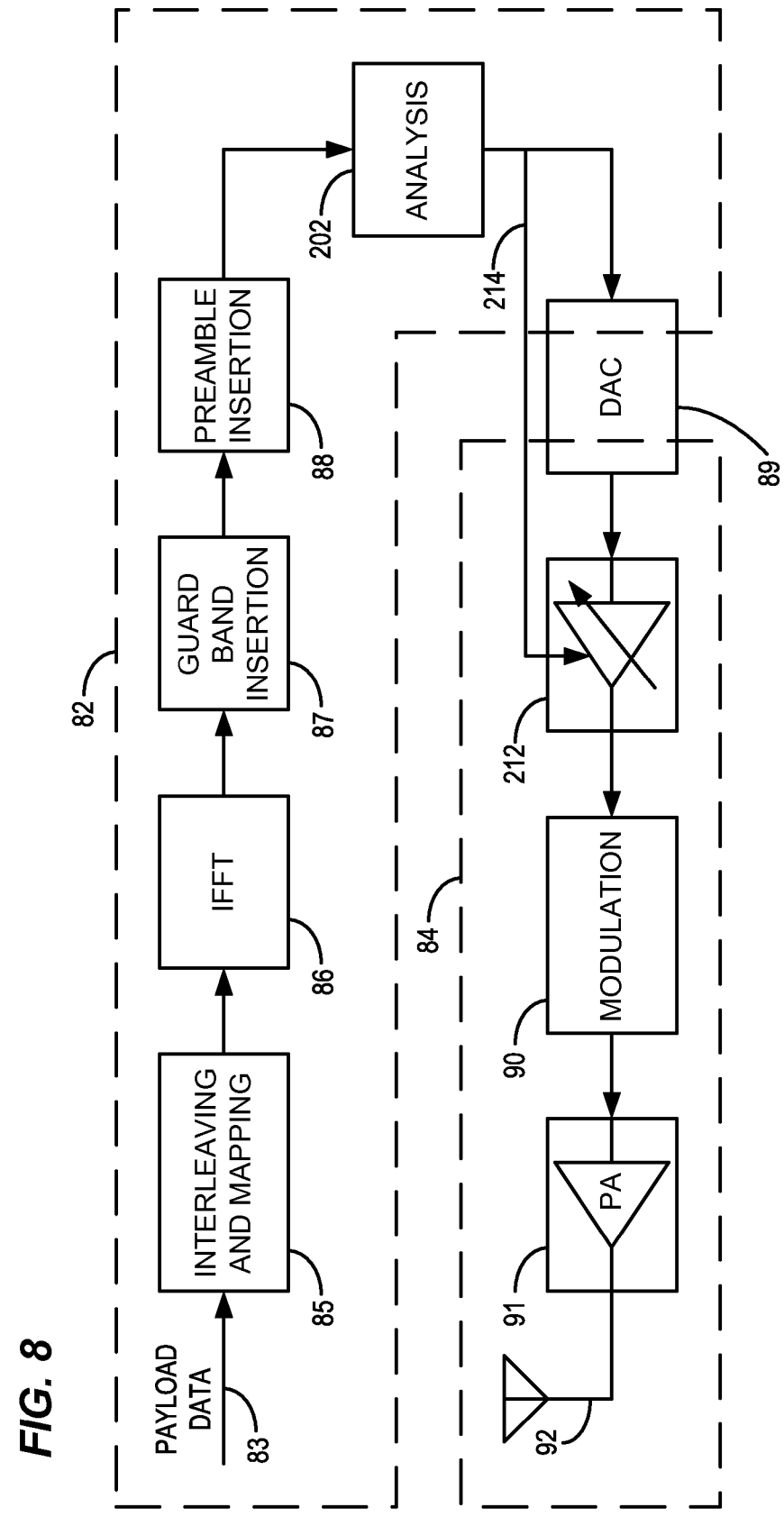
FIG. 8 is a block diagram of an additional alternate embodiment of a transmitter architecture in accordance with a presently described embodiment.

In an alternate embodiment, the STF symbol transmit power is boosted in the analog domain (i.e., after the DAC 89, in the RF subsystem 84) instead of in the digital domain. FIG. 8 depicts another exemplary transmitter architecture 210. In the embodiment depicted in FIG. 8, an amplifier 212, disposed between the DAC 89 and the modulation block 90, is configured to dynamically increase the transmit power of the STF symbols of a data packet in accordance with a signal 214 received from the analysis module 202. It should be noted that in some embodiments, a stand-alone amplifier 212 may be unnecessary and, instead, the power amplifier 91 may receive the signal 214 and dynamically increase the transmit power of the STF symbols of a data packet in response to the signal 214.

As will be appreciated, increasing the power of the STF symbols above the average transmit power for the data packet advantageously improves the packet detection efficiency at the receiver by providing a higher SNR for the STF symbols than would generally be expected over a given channel. However, receivers in WLAN systems often use the STF for setting receiver side amplifier gains (e.g., via automatic gain control—AGC). As a result, increasing the transmit power of the STF symbols relative to the remainder of the symbols in the data packet has the potential to cause sub-optimal AGC gain settings for the data packet in the receiver. One will appreciate that, by upsetting the optimal receiver AGC settings for the data packet, the dynamic range of the receiver analog-to-digital converter (ADC) may likewise be inappropriately set and, specifically, may be higher than optimal for the remainder of the data packet (i.e., the portion of the data packet after the STF). As a result, the effective fixed point resolution for the data portion of the data packet will be reduced, possibly resulting in degraded sensitivity to the data portion. The effects of the boosted STF symbol power may be mitigated in some embodiments by bounding the increased transmit power of the STF symbols and, in particular, by bounding the increase to approximately 3 dB. By so doing, packet detection may be improved without adversely affecting the decoding of the data portion. While increasing the transmit power of the STF symbols by approximately 3 dB may be optimal in an embodiment, in other embodiments the transmit power of the STF symbols is increased by any suitable amount within the range of 0.1 dB to 6 dB, inclusive.

Figure 9:
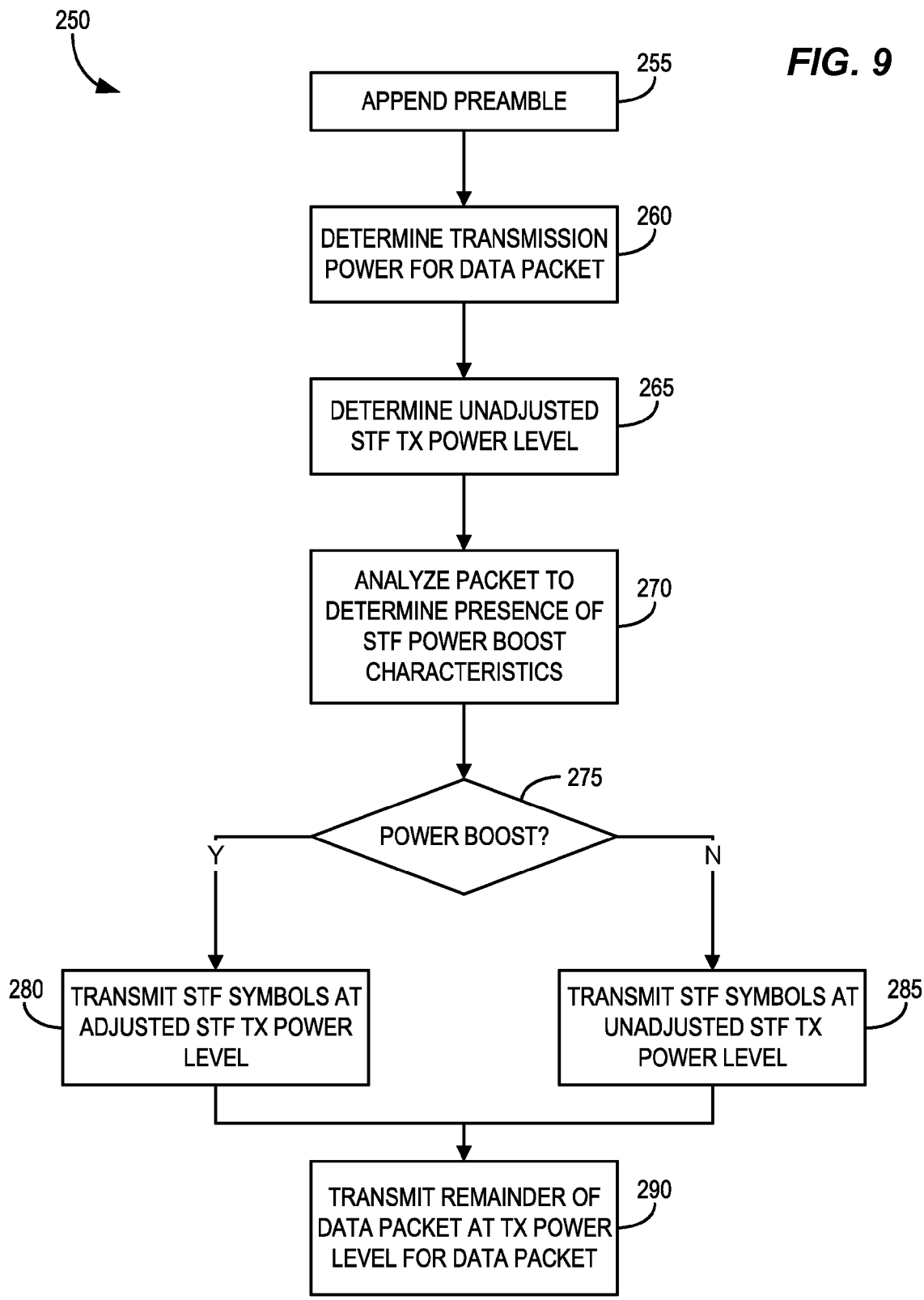
FIG. 9 depicts a method in accordance with a first presently described embodiment.

FIG. 9 depicts an exemplary method 250 for improving packet detection in a WLAN system, in accordance with one or more embodiments. In the method 250, a preamble including at least a short training field (STF) is prepended to a data packet (e.g., by the preamble insertion block 88) (block 255). As used herein, the term "prepended," and variations thereof (e.g., prepend, prepended, prepending, etc.), describe the action of adding at or toward the beginning. The data packet is analyzed to calculate or otherwise determine the average transmission power for the data packet (block 260) and the unadjusted transmit power level for the STF symbols of the data packet (block 265). Thereafter, the data packet is analyzed (e.g., by the analysis module 202) to identify or determine the presence of one or more power boost characteristics (block 270); that is, to determine whether characteristics of the data packet indicate that the transmit power level for the STF symbols should be increased (block 275). If STF power boosting is indicated by the characteristics of the data packet, the transmitter transmits the STF symbols at an adjusted STF power level (block 280) and transmits the remainder of the data packet symbols at the transmit power level for the data packet (block 290). Though not explicitly depicted in FIG. 9, the adjusted STF power level at which the STF symbols are transmitted (block 280) may be calculated or otherwise determined as a separate action. If STF power boosting is not indicated by the characteristics of the data packet, the transmitter transmits the STF symbols at the unadjusted STF power level (block 285) and transmits the remainder of the data packet symbols at the transmit power level for the data packet (block 290).

In an embodiment, analysis of the data packet to determine the presence of STF power boost characteristics (block 270) occurs earlier in the method 250 and, in a particular embodiment, occurs prior to appending the preamble (block 255). That is, the data packet is examined to determine the MCS for the data packet, determine the modulation scheme employed for the data packet, determine the bandwidth of the data packet, etc. and decide whether the STF symbols should be transmitted at the adjusted STF TX power level. Accordingly, in this embodiment, the block diagrams depicted in FIGS. 7A, 7B, and 8 would be modified such that the analysis module 202 is disposed in the flow before the preamble insertion module 88 as in FIG. 7C. The analysis module 202 still provides the signal 203 to the DVGA 204 (or the amplifier 212) to cause STF symbols to be transmitted at the adjusted (or unadjusted) STF TX power levels.

In some embodiments, the transmit power of one or more LTF fields (e.g., LTF, HTLTF, VHTLTF) is increased to improve channel estimation. By increasing the power in the LTF field(s) relative to the power in the data fields, the receiver may capture a signal with a higher SNR, allowing the receiver to more accurately estimate the channel. The estimated channel determined by the receiver in such embodiments will approximate (due to the effects of noise) a scaled-up version of the channel estimate without the boosted power.

Because the estimated channel directly affects the decoding of the data packet, a boosted channel estimate has the potential to result in decoding errors because the true channel seen by the data portion of the data packet is (approximately, again) a scaled down version of the channel estimate. However, in specific cases—where the modulation employed is BPSK or QPSK—the information is conveyed only in the phase of the transmitted signal and not in the magnitude of the transmitted signal. Therefore, for those cases, the magnitude of the channel estimate should not affect the receiver's decoding decisions. Other functions related to the long training fields (e.g., frequency offset estimation) are conducted without any knowledge of the channel (i.e., are non-coherent) and therefore are unaffected by boosting the power of the LTF symbols.

Similarly to boosting the STF transmit power, several characteristics may inform the decision as to whether to increase the transmit power for the symbols of the LTF for a given data packet, which, in an embodiment, are determined by the analysis module 202. In the embodiment, the analysis module 202 detects the modulation and coding scheme (MCS) for the data packet. The analysis module 202 compares the MCS for the data packet to a predetermined set point or a predetermined cutoff, and identifies the data packet as one for which the transmit power for the LTF symbols should be increased when the MCS value is below a certain level (e.g., <2). In an embodiment, the analysis module 202 detects the modulation scheme for the data packet and identifies the data packet as one for which the transmit power for the LTF symbols should be increased when certain transmission constellations (e.g., BPSK, QPSK, etc.) are implemented.

In still another embodiment, the analysis module 202 analyzes the bandwidth of the data packet to determine whether to increase the transmit power for the LTF symbols. For example, in an embodiment the analysis module 202 causes the transmit power for LTF symbols to be boosted in data packets encoded using a block convolutional code and/or in data packets having a bandwidth of 20 MHz. In still other embodiments, the analysis module 202 decides for which data packets LTF transmit power should be increased according to the receiving client (e.g., for some clients and not others), according to the type of packet (e.g., for broadcast packets), according to whether the data packet is beamformed, and/or according to the packet length, etc.

The transmitter architectures of FIGS. 7A, 7B, 8 are configured, in various embodiments to analyze the data packets, determine whether the LTF transmit power should be boosted, and increase the transmit power for the LTF symbols. For example, in an embodiment, the analysis module 202 receives the data packet, analyzes the data packet to determine the presence of one or more LTF boost characteristics, configures the DVGA 204 to increase the signal of the LTF symbols relative to the rest of the data packet (which will result in increased transmit power) and passes the data packet to the DVGA 204. In another embodiment, the analysis module 202 and the DVGA 204 receive the data packet in parallel, and the analysis module 202 analyzes the data packet to determine the presence of one or more LTF boost characteristics and configures the DVGA 204 to increase the signal of the LTF symbols. In still another embodiment, the analysis module 202 configures an amplifier 212 (or the power amplifier 91) to increase the power of the LTF symbols if the analysis module 202 detects the presence of one or more power boost characteristics.

Figure 10:
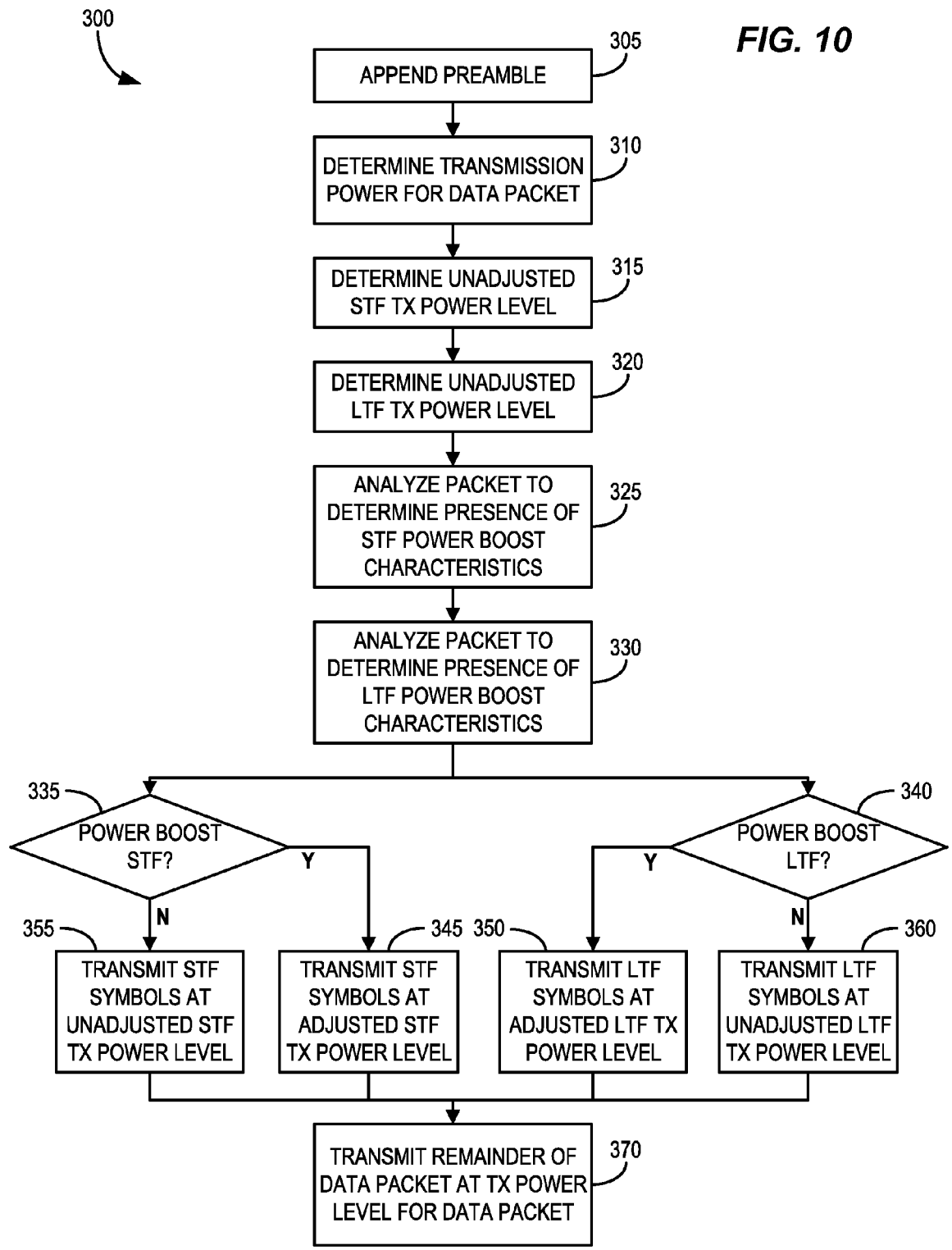
FIG. 10 depicts a method in accordance with a second presently described embodiment.

FIG. 10 depicts an exemplary method 300 for improving packet detection and channel estimation in a WLAN system, in accordance with one or more embodiments. In the method 300, a preamble including at least a short training field (STF) and a long training field (LTF) is prepended to a data packet (e.g., by the preamble insertion block 88) (block 305). The data packet is analyzed to calculate or otherwise determine the average transmission power for the data packet (block 310) and the unadjusted transmit power level for the STF symbols of the data packet (block 315) and the LTF symbols of the data packet (block 320). Thereafter, the data packet is analyzed (e.g., by the analysis module 202) to identify or determine the presence of one or more STF power boost characteristics (block 325) and/or of one or more LTF power boost characteristics (block 330). If STF power boosting is indicated by the characteristics of the data packet (block 335), the transmitter transmits the STF symbols at an adjusted STF power level (block 345), otherwise, the transmitter transmits the STF symbols at the unadjusted STF power level for the STF symbols (block 355). Likewise, if LTF power boosting is indicated by the characteristics of the data packet (block 340), the transmitter transmits the LTF symbols at an adjusted LTF power level (350), otherwise, the transmitter transmits the LTF symbols at the unadjusted LTF power level for the LTF symbols (block 360). In any event, the transmitter transmits the remainder of the data packet symbols at the transmit power level for the data packet (block 370). Though not explicitly depicted in FIG. 10, the adjusted power level at which the STF, LTF symbols are transmitted (block 345, 350) may be calculated or otherwise determined as a separate action.

In some embodiments, the methods 250 and 300 include more or fewer blocks than are shown in FIGS. 9 and 10, or the blocks are performed in a different order. For example, in an embodiment, the method 250 does not include the blocks 260 or 265 in instances where the values are fixed and/or predetermined. In other embodiments, the block 265 is omitted, as once the transmission power for the data packet is determined, the unadjusted STF TX power level is fixed. In still other embodiments, the method 250 includes an additional block in which the adjusted STF TX power level is calculated or otherwise determined. Likewise, in embodiments the method 300 includes additional blocks in which the adjusted STF and LTF TX power levels are calculated or otherwise determined. Likewise, in embodiments the method 300 does not include one or more of the blocks 310-320. For example, in an embodiment, the block 320 is omitted because the LTF TX power level is the same as the transmission power for the data packet.

In an embodiment, analysis of the data packet to determine the presence of STF and/or of LTF power boost characteristics (blocks 325, 330) occurs earlier in the method 300 and, in a particular embodiment, occurs prior to appending the preamble (block 305). That is, the data packet is examined to determine the MCS for the data packet, determine the modulation scheme employed for the data packet, determine the bandwidth of the data packet, etc. and decide whether one or both of the STF and the LTF symbols should be transmitted at adjusted STF/LTF TX power levels. Similar to the embodiment of the method 250 described above, in this embodiment, the block diagrams depicted in FIGS. 7A, 7B, and 8 would be modified such that the analysis module 202 is disposed in the flow before the preamble insertion module 88 (similar to FIG. 7C), and the analysis module 202 still provides the signal 214 to the DVGA 204 (or the amplifier 212) to cause STF and/or LTF symbols to be transmitted at the adjusted (or unadjusted) STF and/or LTF TX power levels.

At least some of the various blocks, operations, and techniques described above with reference to FIGS. 5-10 may be implemented in hardware, a processor executing firmware and/or software instructions, or any combination thereof. When implemented utilizing a processor executing software or firmware instructions, the software or firmware instructions may be stored in any non-transitory, tangible computer readable medium such as on a magnetic disk, an optical disk, a RAM a ROM, a flash memory, etc. The software or firmware instructions may, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While various aspects of the present invention have been described with reference to specific examples, which are intended to be illustrative only and not to be limiting of the invention, changes, additions and/or deletions may be made to the disclosed embodiments without departing from the scope of the invention.

What is claimed is:

1. A method for transmitting a data packet, the method comprising:
   prepending to digital contents of the data packet, i) a preamble including a first preamble field having a plurality of repetitions of a sequence, and ii) a second preamble field configured to be used for channel estimation by a receiver;
   determining, according to a specified communication protocol, a first transmission power level for the data packet;
   determining, according to the specified communication protocol and the first preamble field, a first unadjusted transmission power level for the first preamble field;
   determining, according to the specified communication protocol and the second preamble field, a second unadjusted transmission power level for the second preamble field;
   determining the presence of one or more power-boost characteristics i) of the data packet or ii) of an intended receiving client;
   transmitting the first preamble field at a first adjusted transmission power level different from the first unadjusted transmission power level if one or more first power-boost characteristics are determined to be present, and transmitting the first preamble field at the first unadjusted transmission power level if the one or more first power-boost characteristics are determined not to be present;
   transmitting the second preamble field at a second adjusted transmission power level different from the second unadjusted transmission power level if one or more second power-boost characteristics are determined to be present, and transmitting the second preamble field at the second unadjusted transmission power level if the one or more second power-boost characteristics are determined not to be present; and
   transmitting a remainder of the data packet at the first transmission power level for the data packet.

2. The method of claim 1, wherein determining the presence of one or more first power-boost characteristics of the data packet or of the intended receiving client comprises determining that the modulation and coding scheme (MCS) for the data packet has a value less than 2.

3. The method of claim 2, wherein determining the presence of one or more first power-boost characteristics of the data packet or of the intended receiving client comprises determining that the constellation used for the data packet is a bipolar phase shift keying (BPSK) constellation.

4. The method of claim 1, wherein determining the presence of one or more first power-boost characteristics of the data packet or of the intended receiving client comprises determining that the data packet has a predetermined bandwidth.

5. The method of claim 1, wherein determining the presence of one or more first power-boost characteristics of the data packet or of the intended receiving client comprises determining that the data packet is of a predetermined type.

6. The method of claim 1, wherein determining the presence of one or more first power-boost characteristics of the data packet or of the intended receiving client comprises determining that the data packet is a beamformed packet.

7. The method of claim 1, wherein determining the presence of one or more first power-boost characteristics of the data packet or of the intended receiving client comprises determining that the packet has a predetermined length.

8. The method of claim 1, wherein transmitting the first preamble field at the first adjusted transmission power level comprises transmitting the first preamble field at a transmission power level 3 dB greater than the first unadjusted transmission power level.

9. The method of claim 1, further comprising:
   determining the presence of one or more second power-boost characteristics of the data packet or of the intended receiving client including at least one of: determining that the constellation used for the data packet is a BPSK constellation, determining that the constellation used for the data packet is a quadrature phase shift keying (QPSK) constellation, determining that the data packet is coded using a block convolutional code, determining that the data packet has a predetermined bandwidth, determining that the data packet is of a predetermined type, determining that the data packet is a beamformed packet, or determining that the packet has a predetermined length.

10. The method of claim 1, further comprising implementing a digital variable gain amplifier before a digital-to-analog converter to set the first adjusted transmission power level, the second adjusted transmission power level, and the first transmission power level.

11. The method of claim 1, further comprising implementing a variable gain amplifier after a digital-to-analog converter to set the first adjusted transmission power level, the second adjusted power transmission power level, and the first transmission power level.

12. A communication device comprising:
   a digital communication block configured to receive a digital payload of a data packet, wherein the digital communication block is configured to prepend a preamble including i) a first preamble field having a plurality of repetitions of a sequence, and ii) a second preamble field configured to be used for channel estimation by a receiver;
   a digital-to-analog converter;
   an analysis module configured to determine:
      a first transmission power level for the data packet according to a specified communication protocol;
      a first unadjusted transmission power for the first preamble field according to i) the specified communication protocol and ii) the first preamble field;
      a second unadjusted transmission power level for the second preamble field according to i) the specified communication protocol and ii) the second preamble field;
      the presence of one or more first power-boost characteristics of the data packet or an intended receiving client; and
   a variable gain amplifier configured to boost the first preamble field to a first adjusted transmission power level different from the first unadjusted transmission power level if one or more first power boost characteristics are determined to be present, to provide the first preamble field at the first unadjusted transmission power level if the one or more first power boost characteristics are determined not to be present, to boost the second preamble field to a second adjusted transmission power level different from the second unadjusted transmission power level if one or more second power boost characteristics are determined to be present, to provide the second preamble field at the second unadjusted transmission power level if the one or more second power boost characteristics are determined not to be present, and to provide a remainder of the data packet at the first transmission power level for the data packet.

13. The communication device of claim 12, wherein the analysis module configured to determine the presence of one or more first power-boost characteristics of the data packet or the intended receiving client is configured to determine that the modulation and coding scheme (MCS) for the data packet has a value less than 2.

14. The communication device of claim 13, wherein the analysis module configured to determine the presence of one or more first power-boost characteristics of the data packet or the intended receiving client is configured to determine that the constellation used for the data packet is a bipolar phase shift keying (BPSK) constellation.

15. The communication device of claim 12, wherein the analysis module configured to determine the presence of one or more first power-boost characteristics of the data packet or the intended receiving client is configured to determine that the data packet has a predetermined bandwidth.

16. The communication device of claim 12, wherein the analysis module configured to determine the presence of one or more first power-boost characteristics of the data packet or the intended receiving client is configured to determine that the data packet is of a predetermined type.

17. The communication device of claim 12, wherein the analysis module configured to determine the presence of one or more first power-boost characteristics of the data packet or the intended receiving client is configured to determine that the data packet is a beamformed packet.

18. The communication device of claim 12, wherein the analysis module configured to determine the presence of one or more first power-boost characteristics of the data packet or the intended receiving client is configured to determine that the packet has a predetermined length.

19. The communication device of claim 12, wherein the first adjusted transmission power level at which the digital variable gain amplifier configured to transmit the first preamble field is 3 dB greater than the first unadjusted transmission power level.

20. The communication device of claim 12, wherein:
the analysis module is further configured to determine the presence of one or more second power-boost characteristics of the data packet or of the intended receiving client including at least one of: determining that the constellation used for the data packet is a BPSK constellation, determining that the constellation used for the data packet is a quadrature phase shift keying (QPSK) constellation, determining that the data packet is coded using a block convolutional code, determining that the data packet has a predetermined bandwidth, determining that the data packet is of a predetermined type, determining that the data packet is a beamformed packet, or determining that the packet has a predetermined length.

21. The communication device of claim 12, wherein the variable gain amplifier is a digital variable gain amplifier and is disposed in a signal path between the digital communication block and the digital-to-analog converter.

22. The communication device of claim 12, wherein the variable gain amplifier is disposed in a signal path after the digital communication block and the digital-to-analog converter.

* * * * *